US 6,721,170 B1

United States Patent
Evans et al.

(10) Patent No.: US 6,721,170 B1
(45) Date of Patent: Apr. 13, 2004

(54) PACKAGED HYBRID CAPACITOR

(75) Inventors: David A. Evans, Seekonk, MA (US); Thomas A. Murphy, South Dartmouth, MA (US)

(73) Assignee: Evans Capacitor Company, Inc., East Providence, RI (US)

( * ) Notice: Subject to any disclaimer, the term of this patent is extended or adjusted under 35 U.S.C. 154(b) by 0 days.

(21) Appl. No.: 10/458,275

(22) Filed: Jun. 11, 2003

(51) Int. Cl.⁷ .............................. H01G 9/10; H01G 9/04
(52) U.S. Cl. ..................... 361/519; 361/516; 361/508
(58) Field of Search ...................... 361/502, 503, 361/508, 509, 516–523, 528, 529, 532–538, 541

(56) References Cited

U.S. PATENT DOCUMENTS

| | | | | |
|---|---|---|---|---|
| 4,737,889 A | * | 4/1988 | Nishino et al. | 361/502 |
| 5,369,547 A | * | 11/1994 | Evans | 361/516 |
| 5,469,325 A | * | 11/1995 | Evans | 361/526 |
| 5,559,667 A | * | 9/1996 | Evans | 361/526 |
| 5,737,181 A | * | 4/1998 | Evans | 361/504 |
| 5,754,394 A | * | 5/1998 | Evans et al. | 361/516 |
| 5,982,609 A | * | 11/1999 | Evans | 361/516 |
| 6,094,338 A | * | 7/2000 | Hirahara et al. | 361/502 |

\* cited by examiner

*Primary Examiner*—Dean A. Reichard
*Assistant Examiner*—Eric Thomas
(74) *Attorney, Agent, or Firm*—Leydig, Voit & Mayer, Ltd.

(57) ABSTRACT

A packaged hybrid capacitor according to the invention includes a metal cup having a bottom wall with a periphery and an upstanding sidewall at the periphery and surrounding the bottom wall; a first capacitor electrode located within the sidewall and on the bottom wall of the metal cup; an endless electrically insulating plastic sealing member having a base and an outer wall upstanding from the base, disposed within the metal cup, the outer wall having a shape and size fitting within the cup, adjacent the sidewall of the cup; a metal cover including a top wall and a peripheral skirt extending from and surrounding the top wall and inclined relative the top wall toward an inside surface of the metal cover; a second capacitor electrode on the inside surface of the top wall; a separator disposed between the first and second electrodes; and an electrolyte within the capacitor and in contact with the first and second capacitor electrodes, wherein the sidewall of the metal cup bears against the peripheral skirt, with the outer wall of the sealing member interposed between the sidewall and the peripheral skirt, sealing the packaged hybrid capacitor and electrically insulating the metal cup from the metal cover. The sealing member preferably has a channel shape, in cross-section, including an inner wall opposite the outer wall that is captured between the skirt of the cover and the sidewall of the cup. The sealing member is preferably a plastic polymeric material such as polytetrafluoroethylene, polyethylene, polypropylene, silicone rubber, natural and synthetic rubbers, elastomers, polyvinyl chloride, and a moldable elastomer-polymer blend.

7 Claims, 4 Drawing Sheets

PACKAGED HYBRID CAPACITOR

FIELD OF INVENTION

The invention relates to a packaged capacitor, particularly a packaged hybrid capacitor including a valve metal anode and a pseudocapacitor cathode, sealed within a metal container and having a button shape, that is easily and economically manufactured.

BACKGROUND OF THE INVENTION

Hybrid capacitors are well-known through commonly assigned U.S. patents, for example, U.S. Pat. Nos. 5,369,547, 5,469,325, 5,559,667, 5,754,394, 5,737,181, 5,754,394 and 5,982,609, the contents of which are incorporated herein by reference. These capacitors are referred to as hybrid capacitors because they include an anode of an oxidized valve metal as in, for example, conventional wet slug electrolytic capacitors. Examples of such valve metals which form native oxides include tantalum, niobium, aluminum, and zirconium. Typically, these wet slug capacitors anodes are made by sintering so that a porous anode with an oxide coating is prepared as the capacitor anode. The anode may be a pellet or other self-supporting body, or may be a coating on an electrically conducting support. The wet slug capacitor anode provides an advantage, both in the wet slug capacitor and in the hybrid capacitor, of a relatively high breakdown voltage.

In hybrid capacitors, the cathode is a porous metal oxide film typically used in pseudocapacitors in order to provide a relatively large capacitance. Examples of such metals having at least two stable oxidation states in the electrolyte used in the hybrid capacitor include ruthenium, iridium, nickel, rhodium, platinum, palladium, and osmium. Of these metals, perhaps ruthenium is the most preferred for forming the oxide layer cathode of the hybrid capacitor. Because of the way the voltage applied across a hybrid capacitor divides across the anode and the cathode, the relatively high breakdown voltage of the wet slug capacitor is achieved with the relatively high capacitance provided by a pseudocapacitor.

Hybrid capacitors of various configurations are described in the U.S. patents mentioned above. These capacitors can be manufactured in various sizes and shapes, although the configurations are not always handy for particular installations. Accordingly, it is an objective of the present invention to provide a packaged hybrid capacitor that is compact, easy and economical to manufacture, and that can be easily installed in available space, including on a printed circuit board.

SUMMARY OF THE INVENTION

A packaged hybrid capacitor according to an aspect of the invention includes a metal cup having a bottom wall with a periphery and an upstanding sidewall at the periphery and surrounding the bottom wall; a first capacitor electrode located within the sidewall and on the bottom wall of the metal cup; an endless electrically insulating plastic sealing member having a base and an outer wall upstanding from the base, disposed within the metal cup, the outer wall having a shape and size fitting within the cup, adjacent the sidewall of the cup; a metal cover including a top wall and a peripheral skirt extending from and surrounding the top wall and inclined relative the top wall toward an inside surface of the metal cover; a second capacitor electrode on the inside surface of the top wall; a separator disposed between the first and second electrodes; and an electrolyte within the capacitor and in contact with the first and second capacitor electrodes, wherein the sidewall of the metal cup bears against the peripheral skirt, with the outer wall of the sealing member interposed between the sidewall and the peripheral skirt, sealing the packaged hybrid capacitor and electrically insulating the metal cup from the metal cover.

The sealing member employed in sealing the capacitor preferably has, in crosssection, a channel shape including a inner wall opposite the outer wall. The sealing member is preferably selected from the group consisting of polytetrafluoroethylene, polyethylene, polypropylene, silicone rubber, natural and synthetic rubbers, elastomers, polyvinyl chloride, and a moldable elastomer-polymer blend.

DESCRIPTION OF PREFERRED EMBODIMENTS

Figure 1:
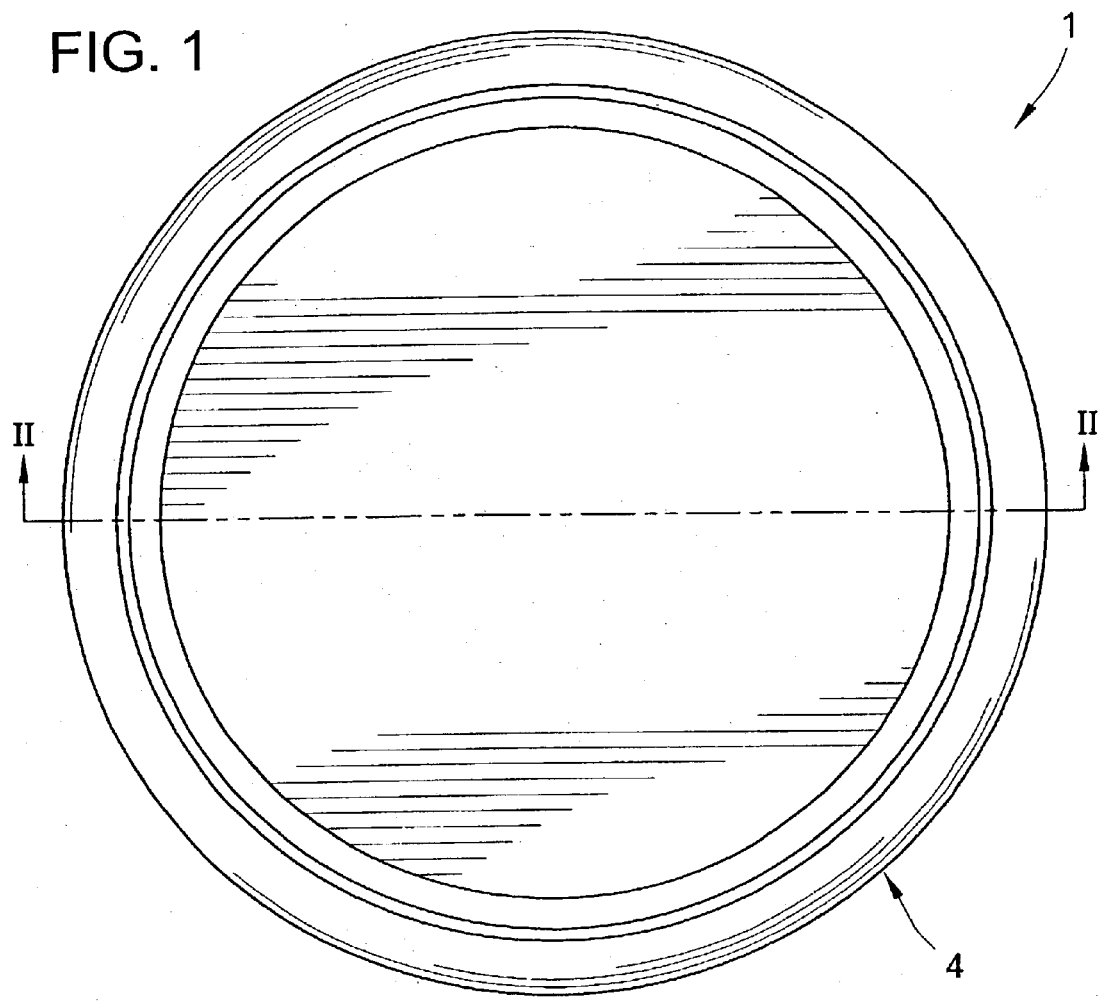
FIG. 1 is a plan view of a packaged hybrid capacitor according to an embodiment of the invention.
Figure 2:
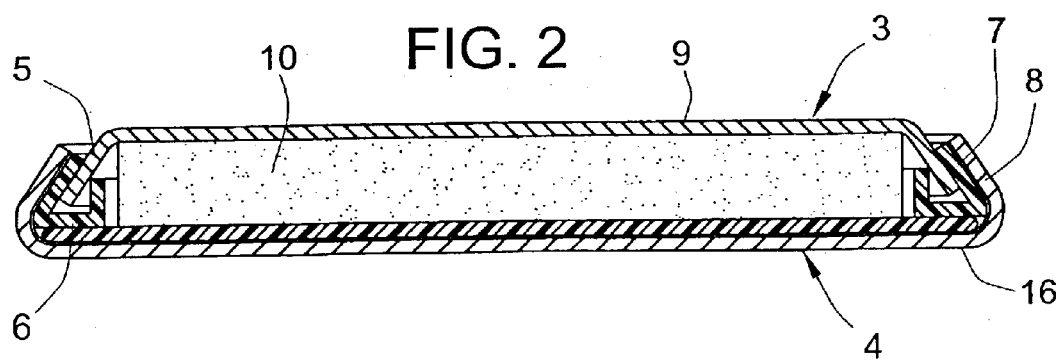
FIG. 2 is a cross-sectional view of the packaged hybrid capacitor of FIG. 1, taken along line II—II of FIG. 1.

FIG. 1 is a plan view of a packaged hybrid capacitor 1 according to the invention. FIG. 2 is a cross-sectional view of the capacitor 1 taken along the line II—II of FIG. 1. The capacitor includes a metallic case comprising a metal cover 3 and a metal cup 4. The cup 4 is crimped against a peripheral skirt 5 of the cover 3 to seal the case. Of course, since the cover 3 and the cup 4 are the electrode terminals of the capacitor, it is essential that the cover and cup be electrically insulated from each other. The electrical insulation is provided by an electrically insulating plastic sealing member 6, best seen in FIG. 3, having an outer wall 7 interposed between a sidewall 8 of the cup 6 that is bent against the peripheral skirt 5 of the cover 3. The embodiment of the packaged hybrid capacitor illustrated in FIGS. 1 and 2 has a circular shape in plan view. In that embodiment, the sealing member 6 is annular. However, a capacitor according to the invention is not limited to this or any other particular shape in plan view.

Figure 3:
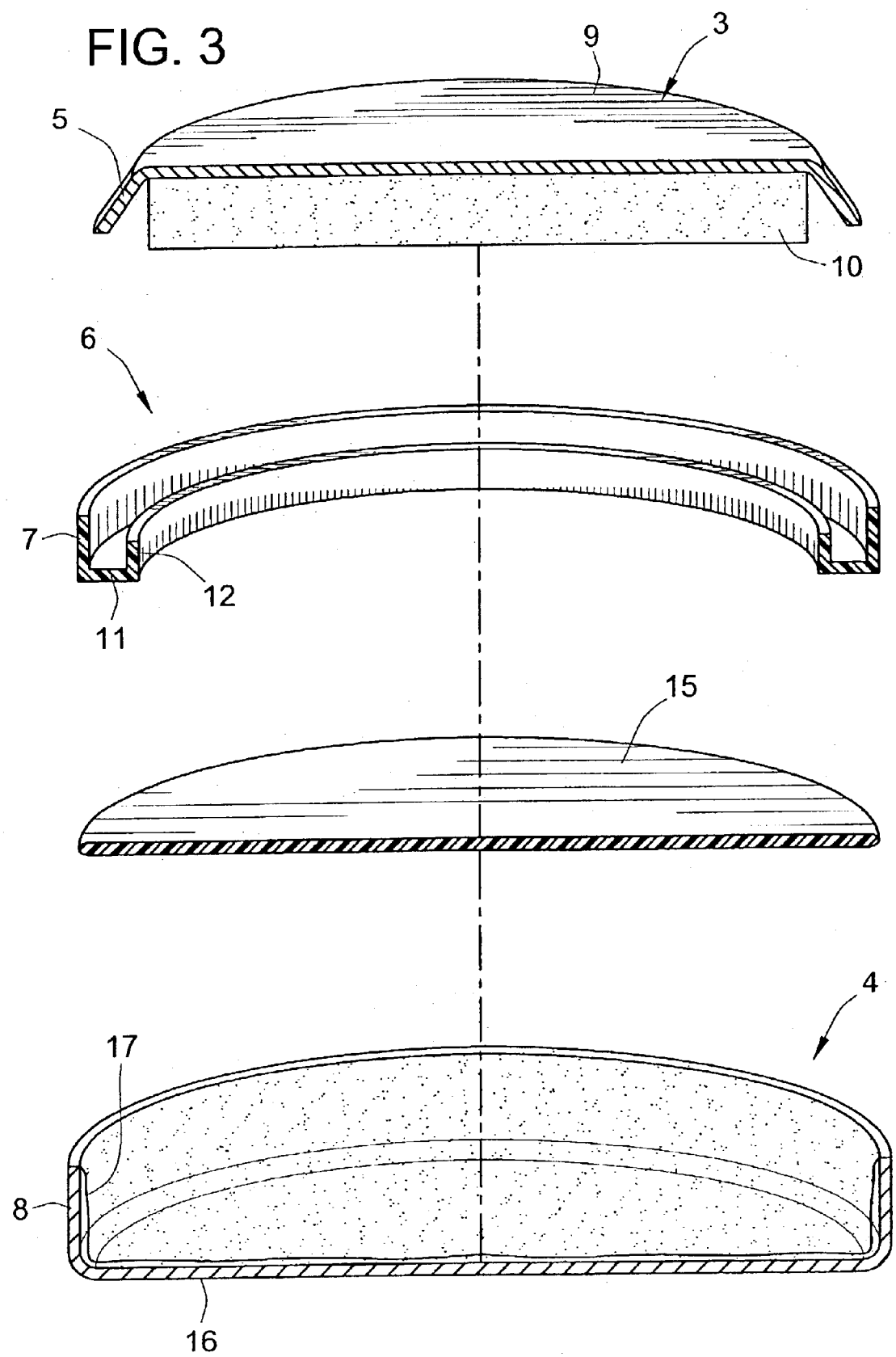
FIG. 3 is an exploded cross-sectional view of the packaged hybrid capacitor of FIG. 1, before final assembly.

The structure of the embodiment of the packaged hybrid capacitor of FIGS. 1 and 2 is most easily understood by considering those figures in conjunction with FIG. 3, an exploded cross-sectional view showing the parts of the capacitor embodiment before final assembly. In this embodiment, the cover 3 is the anode terminal of the capacitor. The cover 3 includes a top wall 9 from which the peripheral skirt 5 depends, preferably oblique to the top wall. The skirt forms, as shown in the upper part of FIG. 3, an inverted container receiving the anode 10 of the packaged hybrid capacitor.

As described, in the hybrid capacitor the anode 10 is an oxidized valve metal such as tantalum, niobium, aluminum, titanium, or zirconium. The preferred material of the cover depends upon the valve metal selected for a particular anode. When the anode is oxidized tantalum, for example, it is preferable that the cover be tantalum metal or titanium. Whatever material is chosen for the cover and for the cup must be chemically compatible with and not significantly attacked by the electrolyte employed in the capacitor, as described below. One example of such an electrolyte is sulfuric acid, which is compatible with a tantalum cup and cover. When the anode is made of aluminum with an oxide coating, a suitable material for the cup and cover is aluminum itself. The anode may be formed separately as a pellet, using known technology employed in manufacturing wet slug and hybrid capacitors. In that event, the pellet is attached to the cover, in the embodiment of FIGS. 1–3, by resistance welding. Alternatively, the pellet can be formed in place on the cover by sintering a pellet of compacted particles of the valve metal. In a still further embodiment, a loop of tantalum wire may be welded to the inside surface of the cover, within the top wall 9, to provide an anchor for an anode pellet that is formed by sintering in situ.

An important feature of the invention is the use of the plastic sealing member 6 to electrically insulate the metal cover 3 from the metal cup 4 while providing a fluid-tight seal between the cover and the cup to prevent the escape of electrolyte from the packaged hybrid capacitor. A preferred form of the electrically insulating plastic sealing member is best understood from FIG. 3, the exploded cross-sectional view of the hybrid packaged capacitor embodiment of FIG. 1. As can be appreciated from FIGS. 1–3, the plastic seal 6 for the illustrated embodiment is an endless member, annular for the circular capacitor depicted. Preferably, the sealing member 6 includes the outer wall 7 that has a size and shape fitting snugly against the inside surface of the sidewall 8 of the cup 4. The outer wall 7 is supported by a base 11 and the sealing member 6 preferably has a channel shape in cross-sectional view. The channel also includes an inner wall 12. The outer wall 7 and the inner wall 12 face and are substantially parallel to each other when the sealing member is manufactured. Since the sealing member is plastic, both the outer and inner walls are subject to deformation and bending with respect to the base 11. As shown in FIG. 3, the inner wall 12 is preferably shorter with respect to the base 11 than the outer wall 7 so that the inner wall does not interfere with the assembly process, as discussed below. The inner wall 12 is preferably present to aid in the guiding and insulating of the peripheral skirt 5 when the cover 3 is placed on the cup 4.

The material of the sealing member is not particularly limited, the only requirements being that it is plastic, i.e., subject to deformation without breaking, and electrically insulating. Preferably, the sealing member is a polymeric material and examples of suitable materials include polytetrafluoroethylene, polyethylene, polypropylene, silicone rubber, natural and synthetic rubbers or elastomers, polyvinyl chloride, and like materials. Of course, the sealing member must be free from attack by the electrolyte and these materials are typically unaffected by any of the candidate electrolytes. A particularly preferred material for the sealing member of a hybrid capacitor according to the invention is a moldable elastomer-polymer blend available from Monsanto and sold under the trademark Santoprene.

As in all electrolytic-type capacitors, capacitors according to the invention include a separator 15 that prevents direct contact between the anode 10 and the cathode of the capacitor, yet permits ionic current flow between the two electrodes. Any material employed as a separator in known electrolytic-type or hybrid capacitors may be used as a separator in the present invention. Examples include paper, plastic fibers, glass fibers, papers made of these fibers, porous membranes, and the well known ion-permeable materials including the trademarked material Nafion. Of course, whatever material is chosen must be compatible with and not damaged by the electrolyte of the capacitor.

The mechanical assembly shown and described in the patent application cannot clearly depict the presence of the electrolyte that is known by those of skill in the art to be essential to the capacitor. The electrolyte may be an aqueous solution or may be a gel. Examples of well-known electrolytes used in electrolytic-type capacitors and hybrid capacitors include aqueous solutions of sulfuric acid, phosphoric acid, nitric acid, potassium hydroxide, and ammonium nitrate. The electrolyte chosen depends upon the materials of the anode and cathode and the compatibility of various electrolytes and materials of the anode and cathode are well known. For example, an aqueous solution of sulfuric acid is well known to be preferred in the capacitor employing a tantalum anode. Ammonium salts dissolved in glycol or a glycol-like solvent may be preferable when the anode is aluminum. When the cathode is nickel, the preferred electrolyte may be potassium hydroxide.

The cup 4 shown in FIG. 3 of the patent application includes the pseudocapacitor cathode. As shown in FIG. 3, the cup 4 includes a bottom wall 16 with the upstanding sidewall 8 that is substantially perpendicular to the bottom wall 16 before assembly of the capacitor. In this embodiment, the cathode 17 of the capacitor is disposed on the inside surface of the bottom wall 16. That pseudocapacitor cathode is a thin film preferably. formed directly on the inside surface of the bottom wall of the cup using techniques known in the art. That oxide film may be formed over the entire inside surface of the cup before the formation of the sidewall 8. In other words, the can 4 may be formed from a planar precursor metal on which the high surface area pseudocapacitor oxide film 17 is formed. Thereafter, the sidewall 8 may be formed by rolling or drawing the cup blank to form the cup 4. Alternatively, the cup 4 may be formed first by drawing or another metalworking technique followed by the formation of the pseudocapacitor cathode 17.

After all of these parts are made, they are assembled as in the exploded view of FIG. 3. The separator 15, which may fill the entire bottom 16 of the cup 4 is placed in the cup on the cathode coating 17, followed by the placement of the sealing member 6. The electrolyte is added and the cover 3, including the anode 10, is placed within the cup 4. The peripheral skirt 5 of the cover 3 is placed within the channel of the sealing member 6, between the inner and outer walls 12 and 7 of the sealing member. Then, the assembly is sealed by crimping, for example in a rolling or a peripheral pressing process, bending the sidewall 8 of the cup 4 inward, capturing and compressing the outer wall 7 of the plastic sealing member between the skirt 5 and the sidewall 8. This simple assembly of few members that essentially align themselves produces a packaged hybrid capacitor inexpensively that is reliably sealed. The completed capacitor has planar terminals at the top and bottom and tapering sidewalls so that the area of the bottom of the capacitor is somewhat larger than the area of the top of the capacitor.

Figure 4:
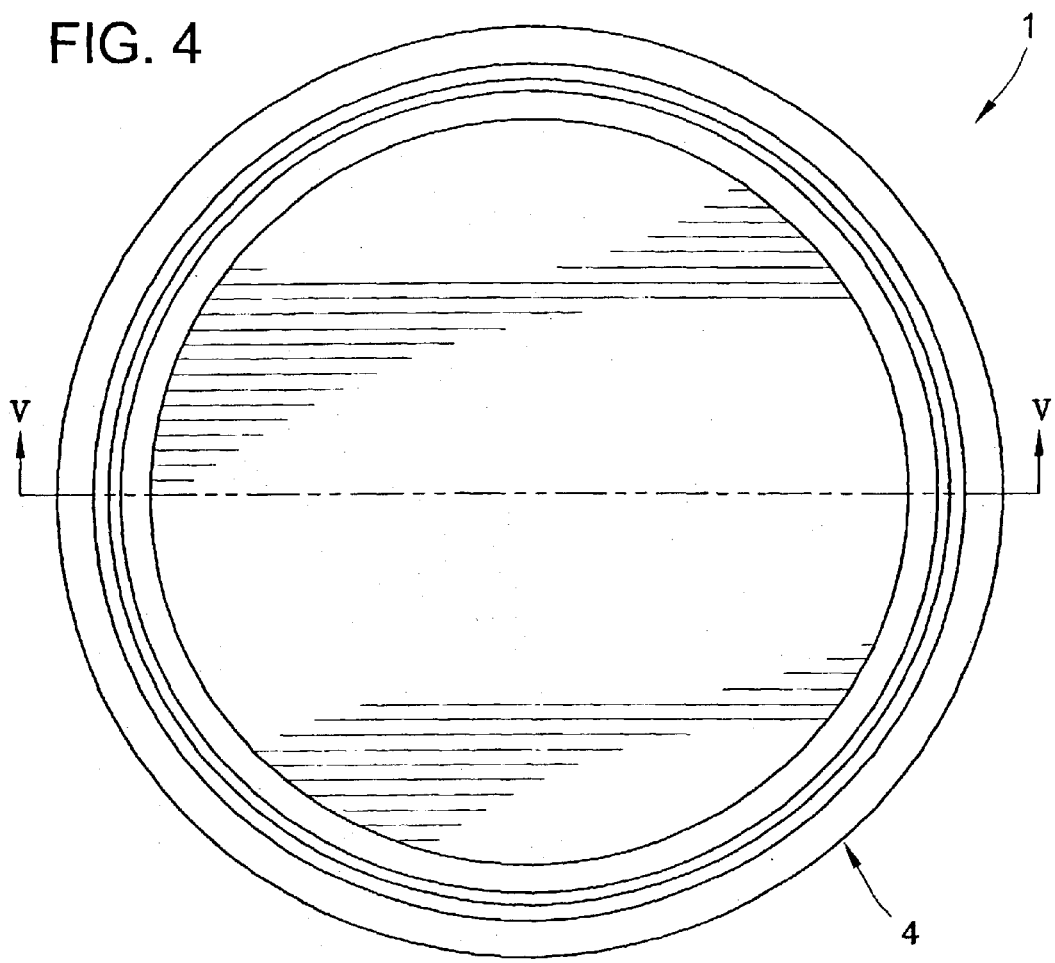
FIG. 4 is a plan view of a packaged hybrid capacitor according to an embodiment of the invention.
Figure 5:
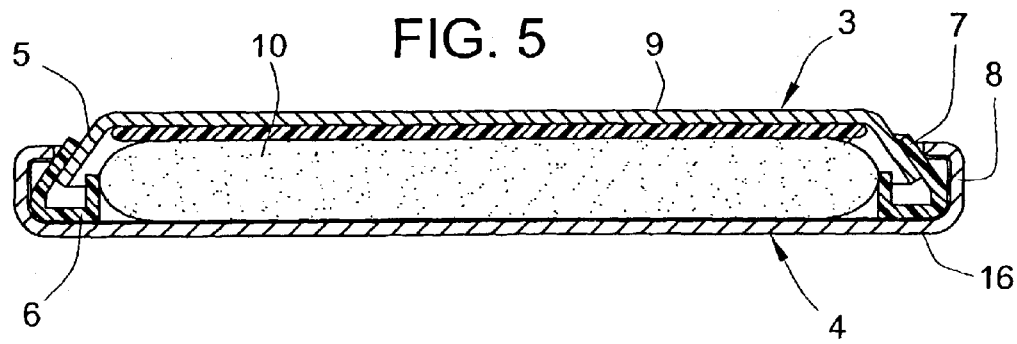
FIG. 5 is a cross-sectional view of the packaged hybrid capacitor of FIG. 1, taken along line V—V of FIG. 4.
Figure 6:
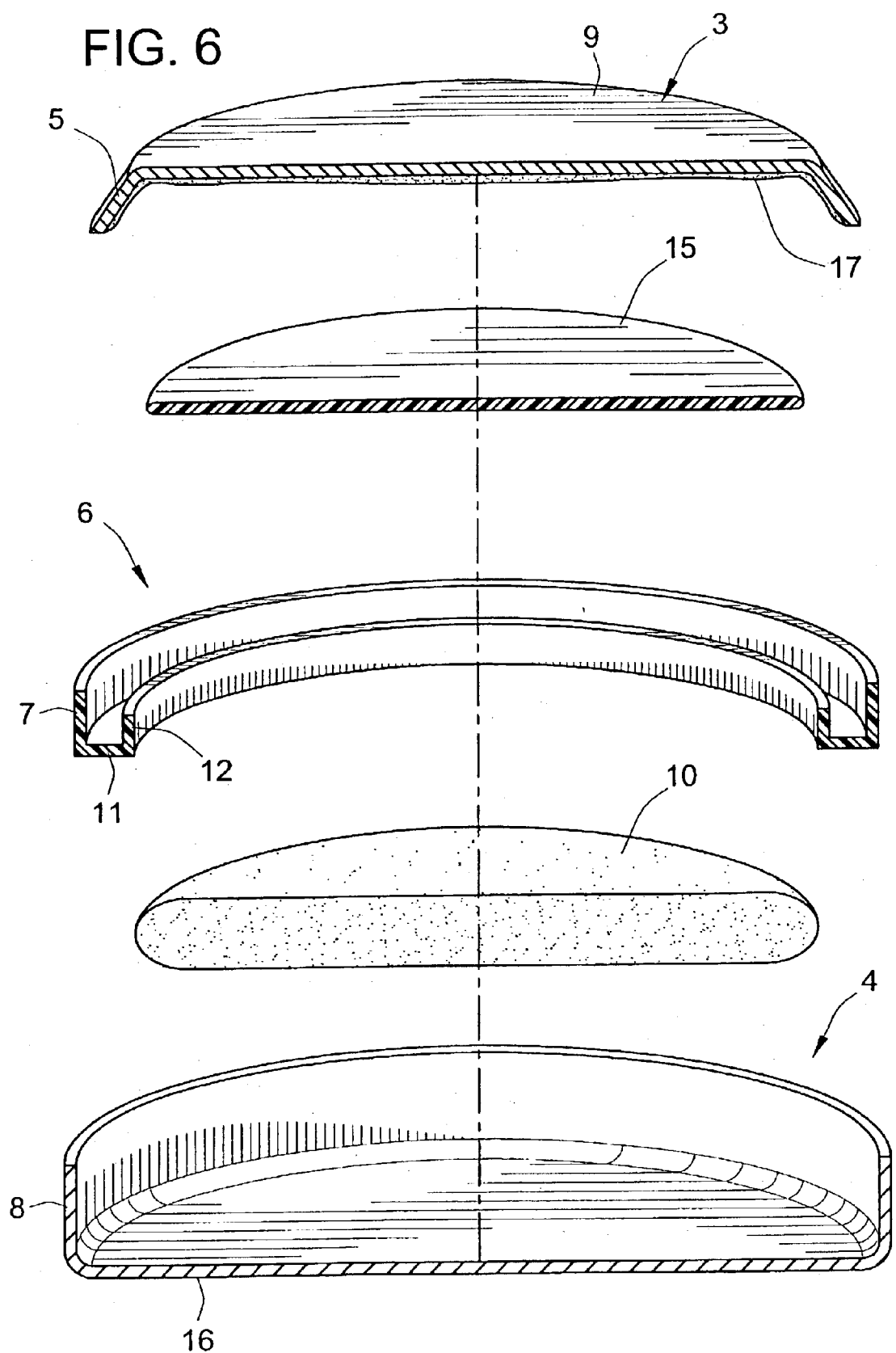
FIG. 6 is an exploded cross-sectional view of the packaged hybrid capacitor of FIG. 4 before final assembly.

FIGS. 4–6 illustrate an alternative embodiment of the invention. In all figures, like elements are given the same reference numbers. The embodiment of FIGS. 4–6 is similar to the embodiment of FIGS. 1–3 except the locations of the anode 10 and the cathode 17 are reversed with respect to the cup 4 and the cover 3. In addition, an alternative shape of the external closure is employed that may be used with the embodiment of FIGS. 1–3. The separator 15 may be relatively smaller.

In the embodiment of FIGS. 4–6, the anode pellet 10, formed in the same way that the anode pellet is formed in the earlier-described embodiment, is attached to the metal cup 4 rather than to the metal cover 3. The attachment may be made by welding, with or without the presence of a wire welded to the inside surface of the bottom 16 of the cup 4. Alternatively, the anode 10 may be formed in and bonded to the inside surface of the bottom 16 by directly sintering a pellet of compressed particles of the valve metal employed as the anode. In this embodiment, as in the earlier-described embodiment, the outer periphery of the anode pellet 10 must be small enough so that it does not interfere with the placement of the plastic sealing member at the bottom of the cup 4.

In the embodiment of FIGS. 1–3, the separator 15 may be interposed between the base 11 of the plastic sealing member 6 and the bottom 16 of the cup 4. In the embodiment of FIGS. 4–6, the base 11 of the sealing member 6 is generally in direct contact with the inside surface of the bottom 16 of the cup 4. Thus, in the embodiments of FIGS. 1–3, the separator generally has the same dimensions and shape as the bottom 16 of the cup 4. In the embodiment of FIGS. 4–6, the separator 15 is placed within the peripheral skirt 5 of the cover 3 so that it generally has a smaller dimension than in the first embodiment. As shown, the separator 15 fits within the inner wall 12 of the sealing member 6. Otherwise, the elements of the embodiments of FIGS. 4–6 are essentially the same as the elements in the embodiment of FIGS. 1–3.

Alternatively, in the embodiment of FIGS. 4–6, the separator 15 can be similar in diameter, relative to the size of the other elements of the packaged capacitor, to the embodiment of FIGS. 1–3. In that event, the perimeter of the separator 15 is bent by the skirt 5 of the metal cover 3 in assembling the capacitor. The bent edge of the separator 15 is then interposed between the skirt 5 of the cover 3 and the anode pellet 10. In other words, in the view of FIG. 5, there is separator material, in addition to the inner wall 12 of the sealing member 6, preventing the anode pellet 10 from contacting the cathode coating 17 on the inside surface of the cover 3, including on the inside surface of the skirt 5.

The sidewall 8 of the cup 4 as shown in FIG. 5 is deformed in forming the closure of the packaged hybrid capacitor and is shaped somewhat differently from the sidewall shown in the embodiment of FIG. 2. Rather than simply bending the sidewall 8 inwardly to compress the outer wall 7 of the sealing member 6 between the generally planar portions of the sidewall 8 and the skirt 5, in forming the closure shown in FIG. 5, the free edge of the sidewall 8 is bent inwardly, directly engaging the outer wall 7 of the sealing member 6. This change in shape of the closure provides a somewhat more positive sealing between the cover 3 and the cup 4 and changes, to a limited degree, the external shape of the packaged hybrid capacitor. The closure of FIG. 5 can also be used in the embodiment of FIG. 2.

The invention has been described with respect to certain preferred embodiments. Various additions and modifications within the spirit of the invention will be apparent to those of skill in the relevant arts. Accordingly, the scope of the invention is defined solely by the following claims.

We claim:

1. A packaged hybrid capacitor comprising:
   a metal cup having a bottom wall with a periphery and an upstanding sidewall at the periphery and surrounding the bottom wall;
   a first capacitor electrode located within the sidewall and on the bottom wall of the metal cup;
   an endless electrically insulating plastic sealing member having a base and an outer wall upstanding from the base, disposed within the metal cup, the outer wall having a shape and size fitting within the cup, adjacent the sidewall of the cup;
   a metal cover including a top wall and a peripheral skirt extending from and surrounding the top wall and inclined relative the top wall toward an inside surface of the metal cover;
   a second capacitor electrode on the inside surface of the top wall;
   a separator disposed between the first and second electrodes; and
   an electrolyte within the capacitor and in contact with the first and second capacitor electrodes, wherein the sidewall of the metal cup bears against the peripheral skirt, with the outer wall of the sealing member interposed between the sidewall and the peripheral skirt, sealing the packaged hybrid capacitor and electrically insulating the metal cup from the metal cover.

2. The packaged hybrid capacitor according to claim 1, wherein the sealing member has, in cross-section, a channel shape including an inner wall upstanding from the base and opposite the outer wall.

3. The packaged hybrid capacitor according to claim 1, wherein the first electrode is an anode comprising an oxidized valve metal, wherein the valve metal is selected from the group consisting of tantalum, niobium, aluminum, titanium, and zirconium, and the second electrode is a pseudocapacitor cathode comprising a porous metal oxide, wherein the metal of the second electrode is selected from the group consisting of ruthenium, iridium, nickel, rhodium, platinum, palladium, and osmium.

4. The packaged hybrid capacitor of claim 3, wherein the anode is a pellet attached to the metal cup and the cathode is a coating on the metal cover.

5. The packaged hybrid capacitor according to claim 1, wherein the first electrode is a pseudocapacitor cathode comprising a porous metal oxide, wherein the metal of the first electrode is selected from the group consisting of ruthenium, iridium, nickel, rhodium, platinum, palladium, and osmium, and the second electrode is an anode comprising an oxidized valve metal, wherein the valve metal is selected from the group consisting of tantalum, niobium, aluminum, titanium, and zirconium.

6. The packaged hybrid capacitor of claim 5, wherein the anode is a pellet attached to the metal cover and the cathode is a coating on the metal cup.

7. The packaged hybrid capacitor according to claim 1, wherein the sealing member is a material selected from the group consisting of polytetrafluoroethylene, polyethylene, polypropylene, silicone rubber, natural and synthetic rubbers, elastomers, polyvinyl chloride, and a moldable elastomer-polymer blend.

* * * * *